US007686616B1

(12) United States Patent
Cloud

(10) Patent No.: US 7,686,616 B1
(45) Date of Patent: Mar. 30, 2010

(54) GLOBE REVERSIBLY CONVERTIBLE TO A MAP

(76) Inventor: William Larry Cloud, 547-1/2 Isbill Rd., Chattanooga, TN (US) 37419

(*) Notice: Subject to any disclaimer, the term of this patent is extended or adjusted under 35 U.S.C. 154(b) by 1065 days.

(21) Appl. No.: 11/338,194

(22) Filed: Jan. 24, 2006

(51) Int. Cl.
*G09B 27/08* (2006.01)

(52) U.S. Cl. .................. 434/147; 434/137; 434/150

(58) Field of Classification Search ................ 434/130, 434/131, 133, 134, 135, 137, 147, 150, 152; 273/157 R
See application file for complete search history.

(56) References Cited

U.S. PATENT DOCUMENTS

| | | | | | |
|---|---|---|---|---|---|
| 964,065 | A | * | 7/1910 | Snedeker | 434/150 |
| 1,081,207 | A | * | 12/1913 | Cahill | 434/137 |
| 2,153,053 | A | * | 4/1939 | Smith | 434/135 |
| 2,393,676 | A | * | 1/1946 | Fuller | 434/135 |
| 2,406,164 | A | * | 8/1946 | Raisz | 434/135 |
| 2,424,601 | A | * | 7/1947 | Crouch | 434/135 |
| 2,436,860 | A | * | 3/1948 | Fisher | 434/135 |
| 3,016,629 | A | * | 1/1962 | Case | 434/147 |
| 3,618,955 | A | * | 11/1971 | Barnes | 273/157 R |
| 3,868,781 | A | * | 3/1975 | Thorel | 434/150 |
| 4,194,305 | A | * | 3/1980 | Smith et al. | 434/150 |
| 4,620,842 | A | * | 11/1986 | Wang | 434/135 |
| 4,884,811 | A | * | 12/1989 | Devorak | 273/157 A |
| 4,937,181 | A | * | 6/1990 | Rogers | 434/150 |
| 5,222,896 | A | * | 6/1993 | Smith, Jr. | 434/135 |
| 5,441,261 | A | * | 8/1995 | Margolis et al. | 273/157 R |
| 5,695,342 | A | * | 12/1997 | Schaper et al. | 434/135 |
| 6,398,221 | B1 | * | 6/2002 | Graham | 273/157 R |
| 7,389,612 | B1 | * | 6/2008 | Fischbeck | 52/81.1 |

OTHER PUBLICATIONS

Martin Gardner, Mathematical Games—On Map Projections, Scientific American magazine, Nov. 1975, pp. 120-125, vol. 233, No. 5, Scientific American, New York NY.

* cited by examiner

*Primary Examiner*—Kurt Fernstrom

(57) ABSTRACT

A cartographic device which can be converted from a globe to a map and vice versa. The marked surface layer of a globe is made removable and usable as a corresponding map. Conversion between the globe and map configurations is reversible and can be repeated indefinitely.

4 Claims, 9 Drawing Sheets

GLOBE REVERSIBLY CONVERTIBLE TO A MAP

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to cartography, specifically to the relationship between globes and maps.

2. Background of the Invention

The words "globe" and "map" as used herein refer, respectively, to three-dimensional and two-dimensional representations of the surface features of a three-dimensional object such as Earth. Other specific terms herein are used as defined in standard mathematical texts and in *Webster's Encyclopedic Unabridged Dictionary of the English Language* (1996 Gramercy Books/Random House).

Historically, Earth and the celestial sphere have been the principal objects of interest in mapping. More recently, maps and globes representing the Moon, Mars, and other planets have also been developed. Globes and maps of Earth, in particular, are produced and used in large quantities.

A fundamental problem in cartography is to provide useful maps of solid objects. A useful map portrays with reasonable accuracy the absolute and relative positions of notable features of the original object, as well as distances, directions, and the outline shapes and sizes of notable features. Various methods of geometric projection have been devised to illustrate the features of spherical Earth, for example, on maps. But no map can portray a round surface such as that of Earth with absolute accuracy. Every method of projection produces certain inherent inaccuracies on a map. Representing any solid object on a map always requires a compromise between accuracy and other practical considerations. The representation on a map of any large portion of such an object usually results in some large inaccuracies.

Spherical globes offer the most realistic representations of spherical objects such as Earth, but globes are relatively difficult and costly to manufacture, they tend to be bulky, and they can be awkward to handle, use, and store. Globes can be accurately made, but in use it is difficult to measure or mark distances and directions on a round globe with ordinary tools. Maps are easier and more economical to manufacture than globes of comparable scale and accuracy, and maps are easier to use and store than globes. Maps are therefore useful and popular in spite of their inherent inaccuracies.

3. Prior Art

Fuller's U.S. Pat. No. 2,393,676 (1946) describes the use of the equilateral cuboctahedron as the basis of a useful mapping system. The equilateral cuboctahedron is a symmetrical solid with fourteen flat faces, six of which are squares and eight of which are equilateral triangles. All of the edges of this polyhedron are equal. In Fuller's method each face of the polyhedron becomes a map of a corresponding portion of Earth's surface, with greater overall accuracy than previous projection methods. A particular benefit of Fuller's technique is that the unavoidable inaccuracies are everywhere distributed within the individual faces of the polyhedron, rather than accumulating to produce large errors in a few places, or being concentrated near the edges of the map, as with most projections. This technique offers greater overall accuracy of feature shapes, sizes, and positions throughout the map, when compared to earlier projection methods.

The equilateral cuboctahedron is a particularly apt and convenient basis for representing a sphere by this technique, because each edge of the figure subtends a central angle of exactly sixty degrees. But Fuller's method is not at all limited to the cuboctahedron. The method can use most convex geometric solids as bases. Fuller eventually focussed his attention upon the regular icosahedron, with twenty (20) congruent equilateral triangular faces, as the preferred basis for his mapping system. The icosahedron provides greater overall regularity than the cuboctahedron, and the larger number of polyhedron faces and map segments yields even greater local and overall accuracy.

OBJECTS AND ADVANTAGES

The object of this invention is to provide an approximately spherical globe of useful accuracy from which an illustrated surface layer can be repeatedly removed for independent use as a map, and repeatedly restored to the original globe configuration. The direct correlation between the original globe and the resulting map will be immediately apparent and informative to the user. The invention is thus an advance over existing cartographic technology, and is a useful tool for education and for other practical purposes.

This invention results from my recognition that the illustrated surface of a globe is itself a map of sorts. Manufactured globes typically consist of a flexible but largely inelastic printed outer map layer appropriately curved and affixed to a rigid spherical inner support form. I realized that a globe could be produced by closely enveloping a rigid spherical globe support form with a minimally stretched, uniformly elastic and flexible substratum which is originally flat, and then marking the usual globe illustrations upon that substratum. If the minimally stretched marked substratum is then somehow removed from the globe support form and allowed to return to its unstretched condition, the result will be a map of useful accuracy with minimal local distortions. One or more appropriate cuts made in that substratum will yield a map in one or more pieces. Thus the globe's illustrated surface is converted directly to a map. This map will be comparable to the original globe in scale, detail and accuracy, except for the minimal distortion resulting from the minimal shrinking and the flattening as the substratum reverts to its original flat shape and size. Those distortions or inaccuracies will be more or less uniformly distributed across the map, and roughly comparable to the results of Fuller's technique.

That hypothetical working sequence represents one conceivable but not necessarily practical way to produce a useful map directly from a globe. A more practical application of the concept involves first cutting and marking the elastic substratum to make a number of distinct individual map segments, and then assembling them upon a rigid spherical globe support form. This is similar to the usual methods of globe manufacture, except that in the present invention the map segments will not be permanently affixed to the solid form.

A further practical extension of this concept involves the use of an approximately spherical polyhedron as the original rigid globe support form, and an inelastic substratum which is cut and fitted exactly to the flat faces of the polyhedronal form and marked with proper map features. It is possible to cover a polyhedronal form with a single piece of substratum properly cut and folded to fit the form faces, but it is probably more convenient to use several smaller pieces. The ultimate reasonable map subdivision involves fitting an individual piece of the marked substratum to each individual face of the globe support form. With the flat faces of a polyhedronal globe support form, errors due to stretching or shrinkage of the substratum can be avoided, but the inevitable inaccuracies of the specific mapping technique used will still pertain.

Numerous geometric solids, particularly the historical regular, equilateral, and symmetrical convex polyhedra, can be used as a basis for the globe of this invention and the associated map. Cutting lines for the map segments logically will coincide with the edges of the polyhedron. The choice of an appropriate geometric solid as a basis will result in acceptable accuracy in both the globe and the map configurations without undue multiplication of component parts. The resulting map segments will be more accurate overall than most complete maps made using traditional projection methods.

Fuller's mapping technique seems well suited to the objectives of this invention. Modern mapping methods which involve photography and computer manipulation of digital images also seem particularly appropriate. Any mapping technique which produces useful accuracy can be used.

This invention is not concerned with any specific geometric basis or mapping technique, beyond an inherent requirement for utility and reasonable accuracy. As originally stated, the object of this invention is to provide an approximately spherical globe of useful accuracy from which an illustrated surface layer can be repeatedly removed for independent use as a map, and repeatedly restored to the original globe configuration.

This invention has numerous evident advantages:
1. The map can be made as either a single articulated piece or a multiplicity of separate segments, using commonly available materials and appropriate printing and manufacturing techniques. No new materials or techniques are required to do this now, but additional suitable materials and techniques can be incorporated as they become available.
2. The ability to use the same map segment or segments interchangeably as either a globe or a map represents a novel, unique, attractive, interesting and useful extension of cartographic technology for educational purposes and for practical uses.
3. The manual activity of converting the device from a globe to a map and vice versa can illustrate and emphasize geographic and cartographic features, principles, and relationships which aren't necessarily obvious when using either a globe or a map alone.
4. The multiplicity of relatively small map segments, each of which fairly illustrates a portion of the surface of the original object being represented, can reduce local and overall mapping inaccuracies to a minimum as compared to traditional projection techniques.
5. The edges and the bisectors of the individual map segments will typically represent great circle arcs on Earth, and thus will aid in visualizing shortest-distance routes from point to point on the globe and on the map.
6. Distances and directions can be conveniently measured on the map with useful accuracy, using standard drafting tools.

The invention is thus a unique and useful educational device and practical tool. Still further objects and advantages will become apparent from a consideration and understanding of the following description and drawings.

The principle of this invention is not limited to original objects which are spherical, but may be applied as well to other three-dimensional objects. The principle is moreover not limited to simple maps, but may also be applied to molded relief maps which represent the gross surface elevation differences of landforms such as mountains. The principle is furthermore not limited to cartography, but can be applied to other fields where it is beneficial to provide a removable surface layer on a solid form. The principle is also not limited to presently available materials and technologies, but may incorporate suitable new materials and technologies as they are developed.

Therefore, the present invention is considered to be a novel and heretofore unobvious combination of features which will prove immediately useful and beneficial in the field of cartography. It is also anticipated that the invention will prove useful in other fields such as mathematics, engineering, architecture, and art.

SUMMARY

This invention is a device wherein the illustrated surface layer of an approximately spherical globe can be easily removed and converted to a map. This device can be used interchangeably either as a globe or as a map which represents, for instance, some portion or all of Earth's surface. This device can be repeatedly converted from the globe configuration to the map configuration, and similarly can be converted back to the globe configuration.

DRAWINGS

FIGS. 1 Through 21

The particular features and advantages of the invention will become apparent from the following description taken in connection with the accompanying drawings in which.

DRAWINGS

Reference Numerals

- 10 icosahedronal globe
- 12 icosahedronal globe support form
- 14 primary working surface of map support
- 16 frame
- 18 framed map support
- 20*a*, 20*b*, etc. triangular map segment
- 22 compact pattern for icosahedron
- 24 pedestal
- 26 frame
- 28 shaft
- 30 traditional style globe base
- 32 tripod globe base
- 34 bowl globe base
- 40 hollow unsupported icosahedronal globe
- 42 edge fastener or adhesive
- 44 vertex fastener or adhesive
- 46 example of great circle route
- 50 icosahedron pattern map
- 52*a*, 52*b*, etc. triangular map segment
- 54 hinge
- 60 icosahedron pattern map
- 62*a*, 62*b*, etc. triangular map segment
- 64 hinge
- 66 edge fastener or adhesive
- 68 vertex fastener or adhesive
- 70 hollow icosahedronal globe/map
- 72 hinge
- 74 string
- 76 eyelet
- 78 string keeper
- 80 truncated icosahedron
- 82*a* hexagonal face
- 82*b* pentagonal face
- 84 pattern for truncated icosahedron
- 90 spherical globe support form
- 92*a*, 92*b*, etc. unmarked spherical map segment
- 100 spherical globe subdivision
- 110 spherical globe support form
- 112*a*, 112*b*, etc. triangular map segment
- 114 edge fastener
- 116 strip fastener
- 118 surface fastener

DETAILED DESCRIPTION

1. Detailed Description of the Preferred Embodiment

FIGS. 1 Through 10

Figure 2:
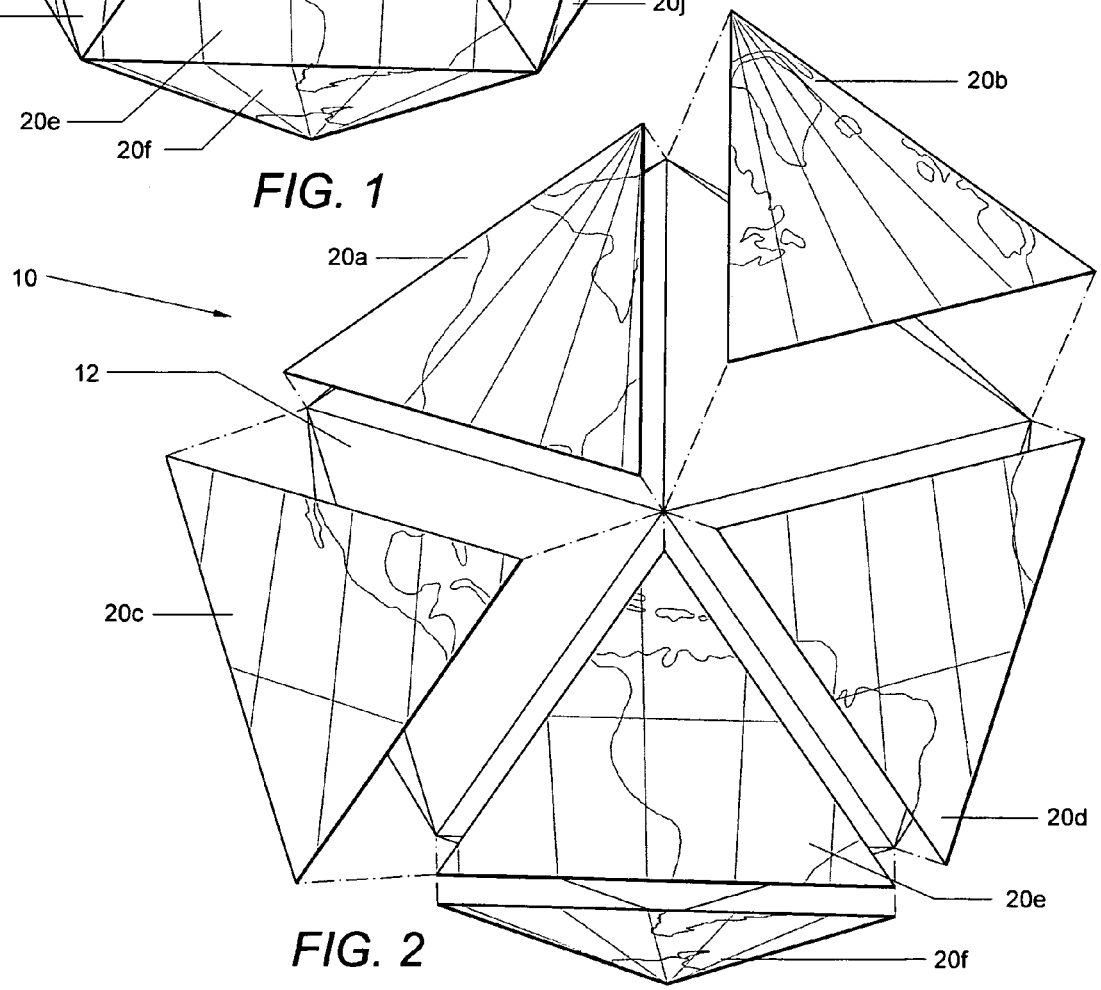
FIG. 2 is a partially exploded view of FIG. 1, showing several individual triangular map segments adjacent to an icosahedronal globe support form.
Figure 3:
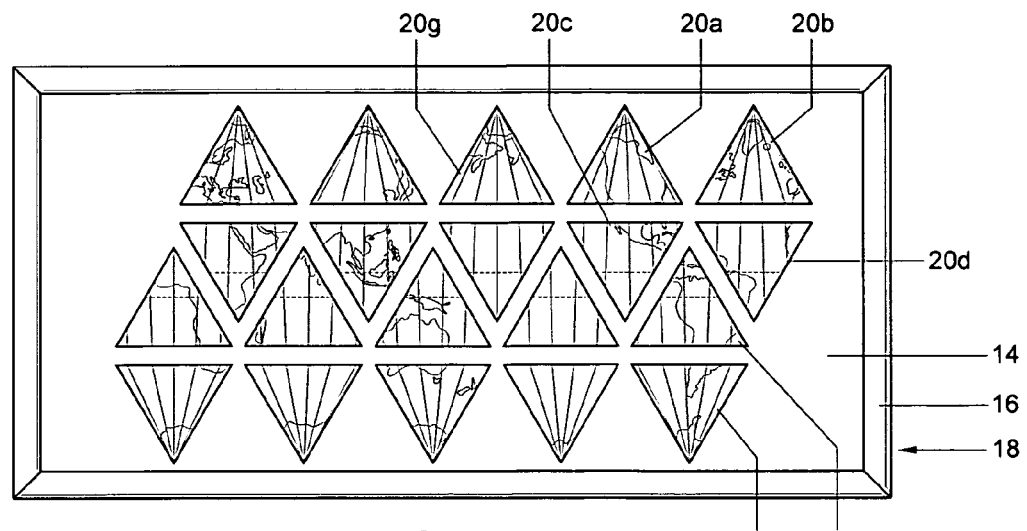
FIG. 3 is a front view of the invention configured as a map, showing a framed map support with twenty (20) individual triangular map segments placed at intervals on the map support.
Figure 4:
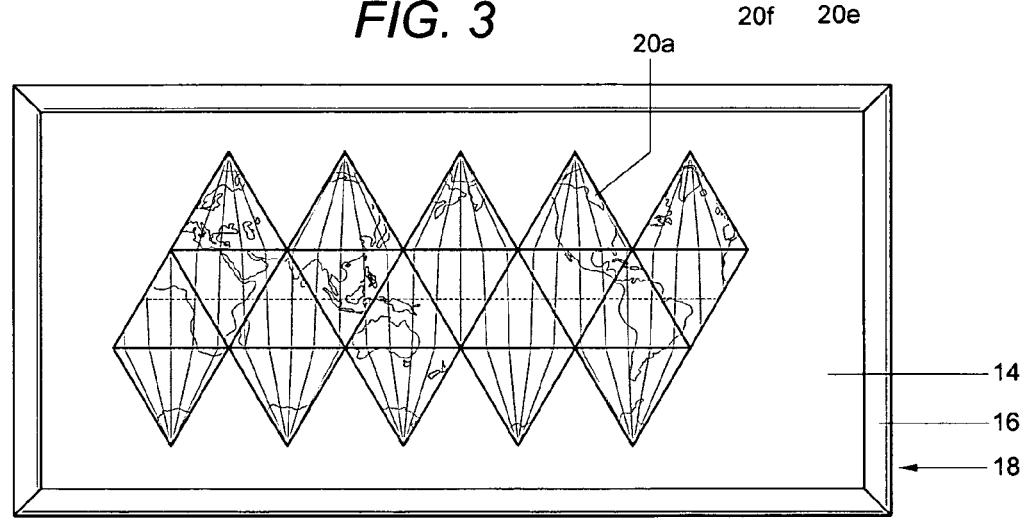
FIG. 4 is a front view of the invention configured as a map in a typical working arrangement on the map support.
Figure 5:
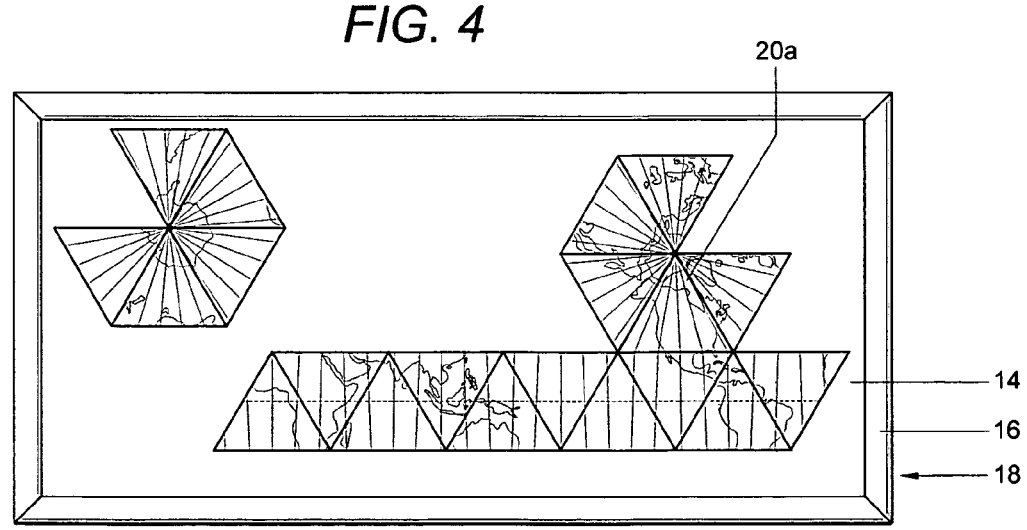
FIG. 5 is a front view of the invention configured as a map in a different working arrangement on the map support.
Figure 6:
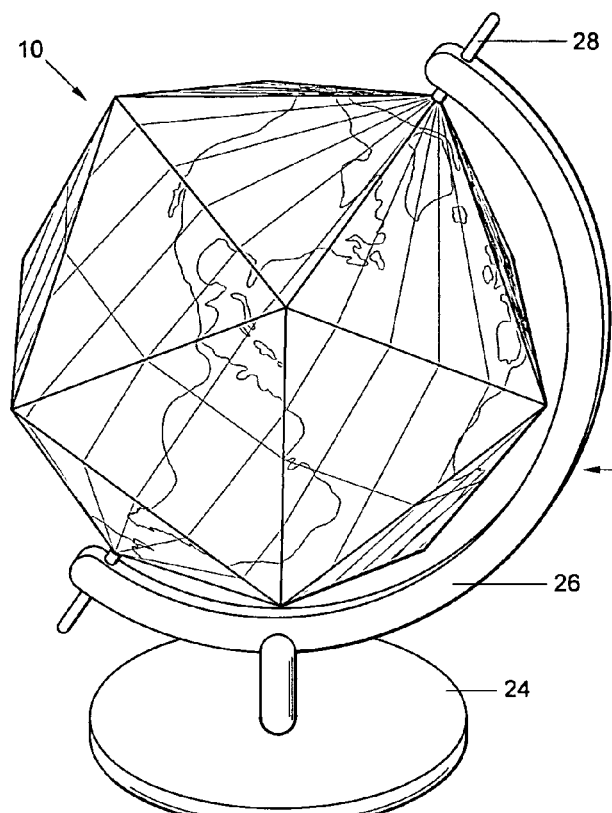
FIG. 6 is a perspective view of the invention configured as an icosahedronal globe supported on a traditionally styled base.
Figure 7:
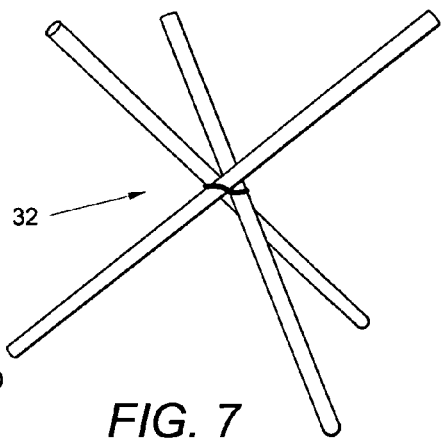
FIG. 7 is a perspective view of a tripod base for the globe of this invention.
Figure 8:
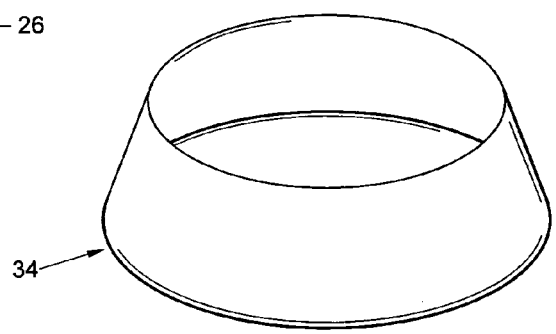
FIG. 8 is a perspective view of a bowl-shaped base for the globe of this invention.
Figure 10:
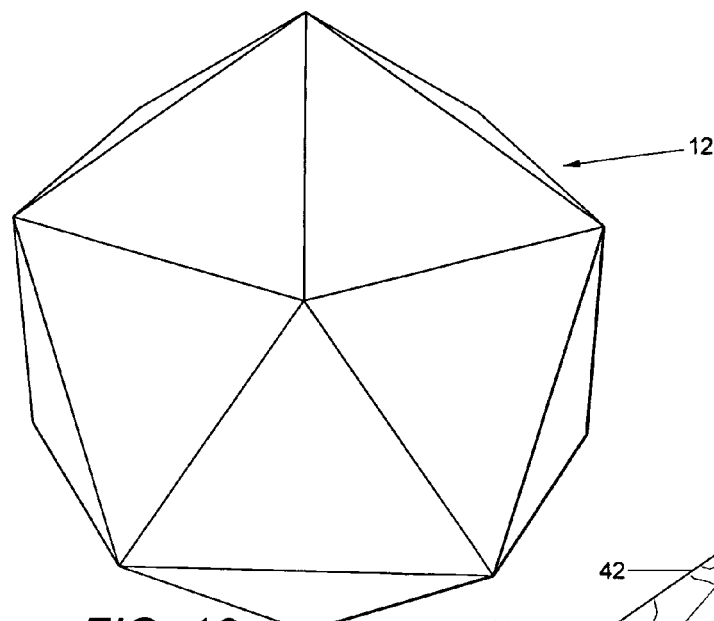
FIG. 10 is a perspective view of a regular icosahedron globe support form.

The preferred embodiment consists of these related manufactures:

1. A rigid, hollow globe support form 12 in the shape of a regular icosahedron, fabricated of thin sheet steel, as illustrated in FIGS. 2 and 10;
2. A rectangular map support 18 as illustrated in FIGS. 3, 4, and 5, of sufficient size to accommodate the map segments described below, fabricated with a working surface 14 of thin sheet steel, and suitably framed for rigidity and user safety, and equipped for wall hanging;
3. A set of twenty (20) individual map segments 20*a*, 20*b*, etc. as illustrated in FIGS. 3, 4, and 5 which together constitute a complete and useful map of Earth's surface, each map segment being an equilateral triangle equivalent in size to the individual faces of the regular icosahedronal support form, the map markings being developed by Fuller's method or another technique of suitable accuracy, and printed upon, or on a suitable stratum affixed to, a thin flexible rubber-like magnetic substratum.
4. An optional base as illustrated in FIGS. 6, 7, and 8 to hold the globe support form and the assembled globe.

Figure 9:
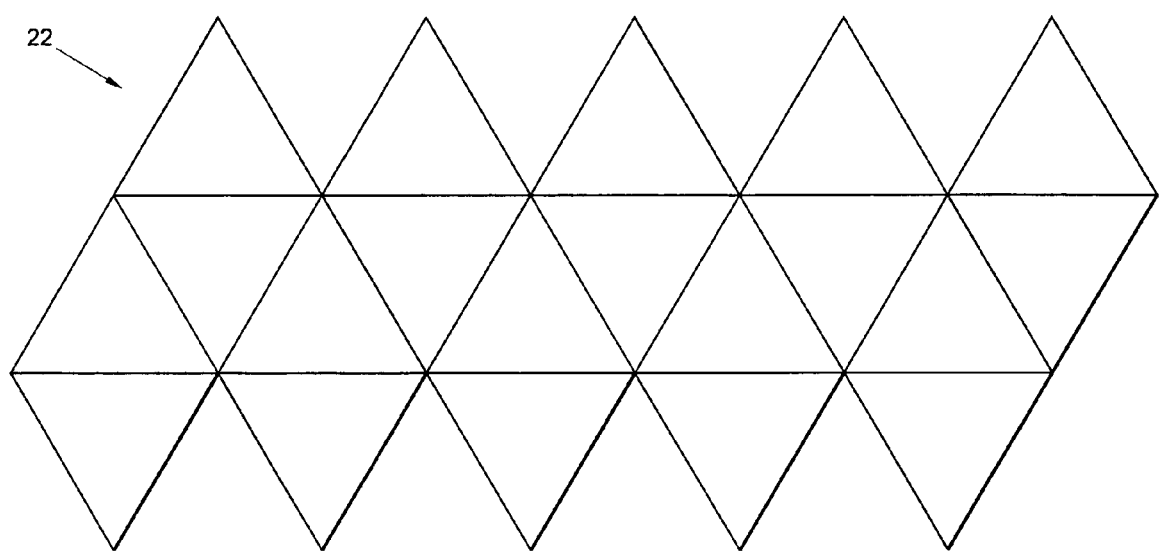
FIG. 9 is a front view of a compact flat pattern of a regular icosahedron.

Icosahedronal Globe Support Form, FIGS. 9 and 10

A polyhedron is a flat-faced, straight-edged, three-dimensional object. A polyhedron is said to be regular if all of its edges are of the same length, and all of its faces are of the same shape and size, and all of its vertices are alike. There are only five different regular polyhedra, the most familiar of which is the cube. The regular icosahedron as illustrated in FIG. 10 is the most complex regular polyhedron and thus most closely approximates a sphere. The regular icosahedron is therefore the preferred geometric basis for this invention. The regular icosahedron is a historically significant polyhedron, and its geometry is well described in numerous resources.

Figure 17:
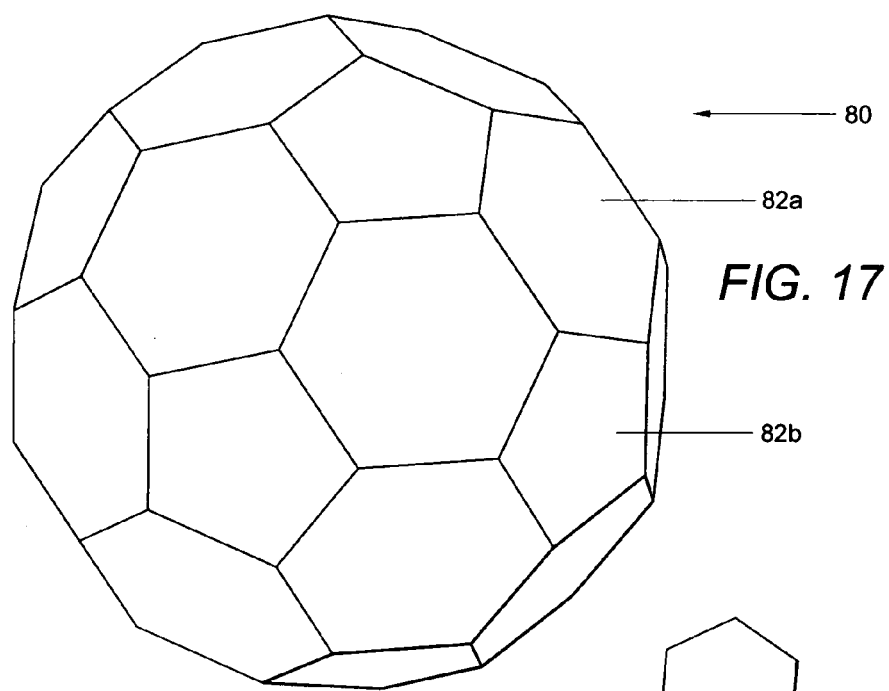
FIG. 17 is a perspective view of an equilateral truncated icosahedron.

Other polyhedra such as the equilateral truncated icosahedron illustrated in FIG. 17 may be more nearly spherical than the regular icosahedron, and they may also be symmetrical as well as equilateral, but still they are invariably irregular. Typically the polygonal faces of such complex polyhedra are a mixture of triangular, square, rhomboidal, hexagonal, and other shapes.

The preferred regular icosahedron has twenty (20) identical triangular flat faces, thirty (30) equal-length straight edges, and twelve (12) identical vertices or points at which five (5) faces and five (5) edges meet. Each flat face of the regular icosahedron is an equilateral triangle. The straight edge length is approximately 1.05146 times the radius of the circumscribed or enveloping sphere. Thus, if it is desired to fabricate an icosahedron comparable in size to a standard twelve-inch (12") diameter or six-inch (6") radius Earth globe, the individual triangle edges must be approximately (6" radius)×(1.05146 factor)=6.31" edge length.

The resulting icosahedron will have a maximum dimension of 12" across opposite vertices or points. Similarly, the icosahedronal equivalent of a standard sixteen-inch (16") diameter globe requires triangle edges of approximately 8.41" length. An icosahedron equivalent to a large thirty-two-inch (32") diameter display globe has edges of 16.82" length. Again, those 12", 16", and 32" example sizes represent the maximum dimension of the icosahedron, as measured across opposite vertices or points. The minimum width or effective diameter across the flat faces is approximately 0.8 times that maximum dimension.

It will be tempting, and will seem deceptively simple, to design and build very large globes by the method herein described. It is advisable for any designer or fabricator to keep in mind the limited widths of doors, for example, when choosing a representative diameter for this invention. Although the individual triangular faces may be of quite reasonable size, convenient and economical, the assembled globe support form and the globe may be too large to pass through standard doors.

The manufacture of a steel regular icosahedron for use as the rigid globe support form 12 of this invention will not be difficult for anyone knowledgeable and skilled in the art of sheet metal fabrication. No extraordinary knowledge or technique is required to fabricate this device. Steel is chosen as the preferred material because of its natural compatibility with the magnetic substratum preferred for the map segments as described below. Thin sheet steel in the range from 26 gauge (0.018" thick) to 20 gauge (0.036" thick) should be satisfactory for most globes of ordinary size. Either solid or perforated sheet material can be used, as desired. Perforated material is lighter in weight than solid material but is usually more expensive, and less strong and rigid, than solid material.

Fabrication can be accomplished in several ways. One straightforward method is to begin by cutting twenty (20) identical equilateral triangular pieces of the desired size. These pieces are then joined together at their edges to form the icosahedron by welding, brazing, soldering or other appropriate techniques. The individual pieces may also be riveted, glued, or otherwise attached to each other using suitable pre-formed edge joiner strips, or the pieces may have appropriate edge-joining tabs incorporated into them. Alternatively, a combination of bending and edge joining can be used, with reference to the flat pattern 22 of the icosahedron as represented in FIG. 9. For reference when bending, the external dihedral angle between faces of the regular icosahedron is approximately 138 degrees.

The assembled steel icosahedronal globe support form can be given a suitable protective finish by plating, painting, powder-coating, or other processes, as desired.

Map Support, FIGS. 3, 4, and 5

The purpose of this map support 18 is to provide for convenient, semi-permanent, and safe display of the map of this invention. The map support can be laid on a table or other horizontal support; it can be leaned against a wall; or it can be hung vertically in the manner of a chalkboard, corkboard, or standard framed display map.

The preferred primary material for the working surface 14 of this map support is thin galvanized steel sheet, for example 26 gauge (0.018" thick). For use with the nominally 12" globe described above, an appropriate minimum size is 24"×48"; such proportions are illustrated in FIGS. 3, 4, and 5. These proportions will allow sufficient area for various arrangements of the map segments properly adjacent as illustrated, in order to take full advantage of the various features of the invention.

Construction of this map support 18 should resemble that of any similar-sized hanging display object. Begin with the steel sheet 14 to which a substantially rigid backing material such as plywood or composition board may be affixed using a suitable adhesive. Provide an appropriate edge covering or frame 16 of wood, plastic, or metal around the full perimeter of the sheet for rigidity and for user safety. Provide appropriate hooks, eyes, or wire(s) for wall hanging.

Map Segments, FIGS. 1, 2, 3, 4, and 5

The twenty (20) individual map segments 20a, 20b, etc. will be all of the same size and shape, equilateral triangles with edge lengths equal to the edges of the rigid globe support form described above.

The preferred substratum for the map segments is thin (approximately 0.020" to 0.030" thick), rubber-like, flexible but inelastic magnetic material. This material is widely used at present for removable automobile and truck door signage, various advertising specialties, and trinkets such as "refrigerator magnets." This material will typically accept printing directly and the map illustrations can be applied accordingly. Otherwise, the map illustrations can be printed upon an appropriate stratum of paper or other material which is then affixed to the magnetic substratum.

The map illustrations can be developed by numerous appropriate methods. The relatively small size of the numerous individual map segments allows for a variety of acceptable techniques to produce a useful map with minimal variations of scale. Fuller's method of mapping as described in his 1946 patent is an obvious possibility. Current artificial satellite, photographic, and digital computer technologies offer additional ways to achieve satisfactory representations of Earth's surface on the map.

It is reasonable and useful to mark appropriate portions of the traditional lines of longitude and latitude on the individual map segments. A simple legend on each map segment showing the average scale in miles and kilometers, and compass directions, will also be beneficial. Labels or match-marks at each edge of every map segment will be helpful to inexperienced users of this globe and map.

Design, layout, and printing of the map as described on the recommended material can be accomplished using existing commercial graphics techniques and equipment.

Base for the Globe Support Form, FIGS. 6, 7, and 8:

An optional simple base such as a tripod 32 illustrated in FIG. 7, or a bowl-shaped device 34 illustrated in FIG. 8, can be used to hold the icosahedronal globe support form with or without the map segments in place. Alternatively, a base 30 substantially resembling a traditional globe stand as illustrated in FIG. 6, with a pedestal 24, a frame 26, and a shaft 28 to hold the globe support form substantially upright and to allow it to rotate, will be useful. Additionally, the globe support form may be designed to be suspended from a ceiling or other support. Appropriate details for such specific mountings can be incorporated into the pole(s) of the rigid globe support form.

Use of the Invention, FIGS. 1, 2, 3, 4, 5, and 12

The twenty (20) triangular map segments 20a, 20b, etc. can be positioned appropriately and adjacently upon the twenty

Figure 1:
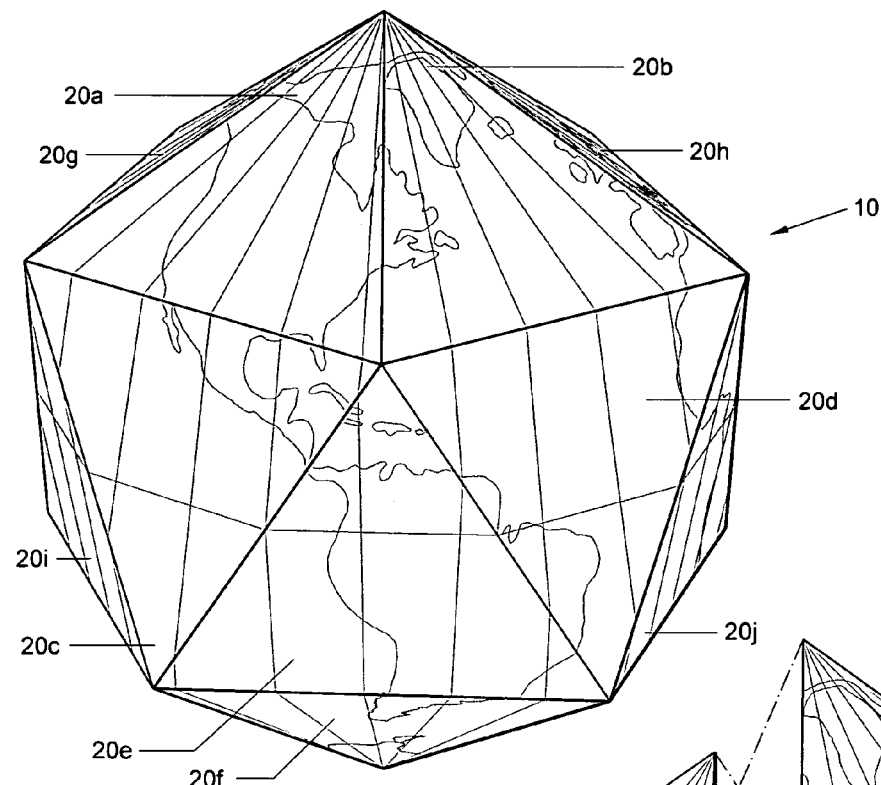
FIG. 1 is a perspective view of the invention configured as a globe in the shape of a regular icosahedron.

(20) triangular faces of the steel icosahedronal globe support form 12 as in FIG. 2 and thus represent a traditional Earth globe as in FIG. 1. The magnetic substratum of each map segment will attach each map segment firmly but removably to the steel globe support form 12. This icosahedronal globe configuration is obviously not spherical, and it does have certain inherent inaccuracies of scale, but those perceived defects or deficiencies are outweighed by the various advantages as described.

The twenty (20) map segments 20*a*, 20*b*, etc. can also be selectively positioned upon the map support 18 as in FIG. 4 and thus form a useful map of Earth. The map support can be positioned either horizontally or vertically, or at any slope between those extremes, consistent with the specific features of the map support as fabricated. The magnetic substratum of each map segment will attach each map segment firmly but removably to the steel sheet 14 of the map support 18. Because this configuration utilizes the same map segments as does the globe described above, it shares the same minor inaccuracies of scale. But the overall map accuracy should nevertheless be greater than with traditional map projections, and the relatively minor inaccuracies which do exist are distributed more or less uniformly within and among the individual map segments, rather than accumulating as large errors in a few places or being concentrated near the edges as with most map projections.

The map segments can also be placed and used upon any table, desk, or similar approximately horizontal surface without the necessity for a separate map support.

The invention as described has a number of practical and educational benefits as compared to the prior art. The physical and mental activity of manipulating the various map segments, while assembling either the globe or the map, and while repeatedly converting from one configuration to the other, offers enlightenment and entertainment which traditional globes and maps cannot provide. Proper arrangement of the various individual map segments requires greater attention to detail than does mere perusal of any traditional globe or map. Properly arranging the map segments on the globe support form or as a map clearly illustrates the relationships between and among the different segments of the map and the landforms, etc. which are portrayed upon them.

Figure 12:
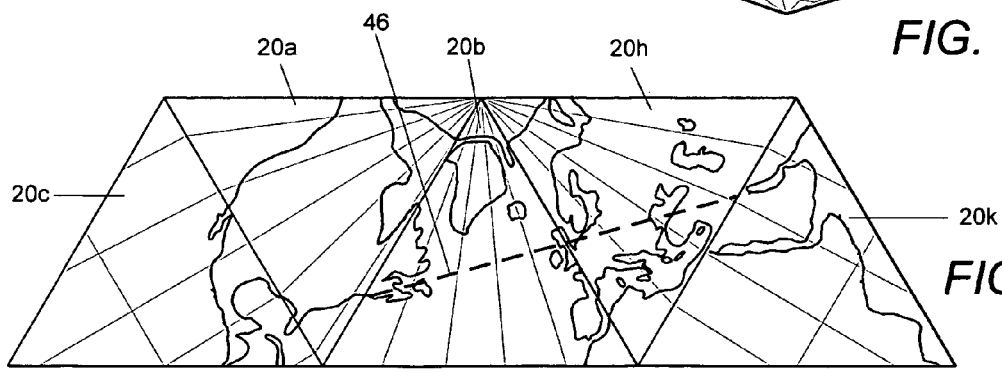
FIG. 12 is a front view of a portion of the map of this invention, showing the straight-line character of an approximate great circle route.

The edges and the perpendicular bisectors of the edges of the individual triangular map segments 20*a*, 20*b*, etc. as described all represent great circle arcs on Earth, and thus aid in visualizing shortest-distance great circle routes from point to point on the map as illustrated by line 46 in FIG. 12. The map configuration allows for varied arrangements of the map segments properly adjacent to each other as in FIGS. 4 and 5, for emphasis of various relationships between and among the different land masses and seas. Proper positioning of adjacent map segments on the map support 18 allows an ease of route planning and also measurements of distance and direction which are not possible with most map projections and most one-piece maps.

Several additional embodiments are described below. These additional embodiments include the use of different materials for the map segments and the supports, the use of different geometric shapes for the globe, incorporation or omission of the rigid globe support form, and joining of the individual map segments into an articulated whole. These additional embodiments as described below share the general mapping and printing techniques which have already been described. The use and/or operation of these additional embodiments is generally similar to the use and/or operation of the preferred embodiment. A skilled and thoughtful worker can thus utilize a wide variety of materials, attachment methods, and geometric shapes to fulfill the purposes of this invention.

2. Description of Additional Embodiments

FIGS. 1 Through 5

The preferred embodiment as already described (#1 above) is perhaps the best representative of a large group of related embodiments of the invention. Numerous additional embodiments consist of manufactures similar in configuration to those described in the preferred embodiment (#1). They differ from the preferred embodiment only in the specific materials used and in the method of attaching the individual map segments to the globe support form and the map support. In addition to the steel supports and the fully magnetic map substratum of the preferred embodiment, numerous other materials and attachment methods can be used to achieve the same useful effect.

The globe support form 12 and the primary surface 14 of the framed map support 18 can be fabricated using almost any substantially rigid material, including but not limited to:
  A. Metal, for example aluminum, brass, and steel;
  B. Plastic, for example acrylic, polycarbonate, and styrene;
  C. Composites, for example fiberglass
  D. Wood and wood composition board;
  E. Cardboard and other paper derivatives.

The map segments 20*a*, 20*b*, etc. can be produced using almost any flexible or rigid inelastic material, including but not limited to:
  A. Metal;
  B. Plastic;
  C. Composites;
  D. Wood and wood composition board;
  E. Cardboard and other paper derivatives;
  F. Fabric, woven or non-woven, natural or synthetic fibers.

Methods of attaching the map segments to the globe and map supports include but are not limited to the following, any of which may be used in the form of spots, strips, or extended areas:
  A. Magnets;
  B. Hook-and-loop fasteners (Velcro brand and others);
  C. Non-tacky reusable adhesive;
  D. "Static cling" material;
  E. "Flannelgraph" material.

This description of a variety of additional embodiments makes it apparent that numerous useful combinations of existing materials and methods of attachment are possible. Each of these combinations will offer its own specific advantages and disadvantages in manufacture, in use, and in economy. In the preferred embodiment, the choice of steel for the rigid supports and flexible magnetic material for the map substratum has obvious advantages of simplicity in both manufacturing and use, because the combination requires no separate or discrete fasteners. Other combinations of materials, manufacturing techniques, and fasteners may offer advantages over the preferred embodiment in weight, economy, and/or simplicity.

3. Description of Additional Embodiment

FIG. 11

Figure 11:
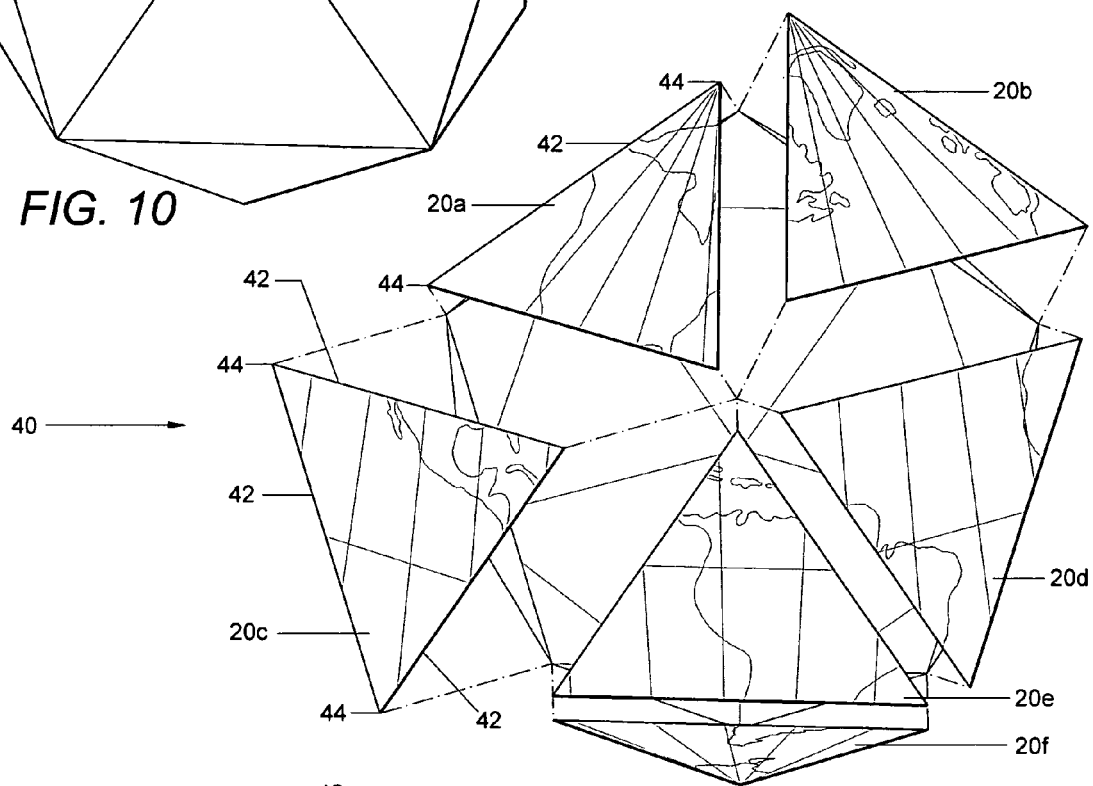
FIG. 11 is a partially exploded perspective view of the globe of this invention in a hollow unsupported embodiment, showing several individual triangular map segments prior to being positioned and attached to each other.

An additional embodiment 40 as shown in FIG. 11 consists of a device similar to those described in embodiments #1 and #2 above, but without a rigid globe support form. The twenty

(20) individual map segments 20a, 20b, etc. are manufactured and printed as described earlier, using a rigid substratum. Appropriate fasteners and/or adhesives as described earlier are placed along the edges 42 and/or at the vertices 44 of the map segments. The globe 40 is assembled without need for an internal support by positioning the map segments 20a, 20b, etc. properly adjacent to each other and engaging the edge 42 and/or vertex 44 fasteners and/or adhesives, which then maintain the relative positions of the map segments and the shape of the globe. When desired, the globe can be disassembled by releasing the various fasteners or adhesives. The map segments can then be arranged on a table or other horizontal surface, or attached to an appropriate map support 18 as described earlier.

4. Description of Additional Embodiment

Figure 13:
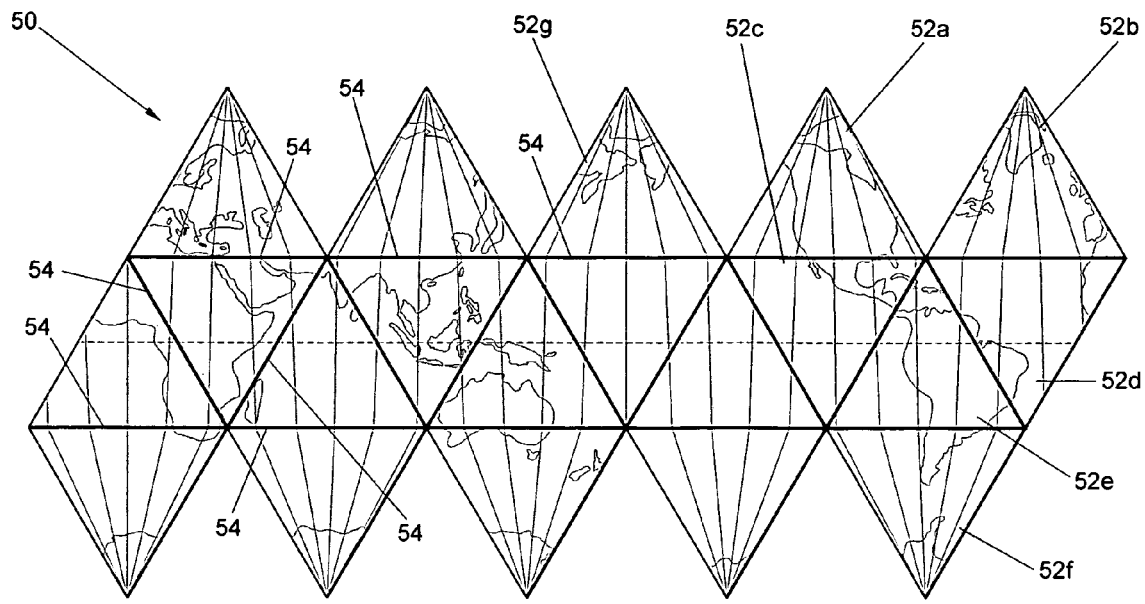
FIG. 13 is a front view of the map of this invention in the form of a compact flat pattern of a regular icosahedron with hinges between all adjacent pairs of triangular map segments.

FIGS. 1, 4, and 13

An additional embodiment is similar to the preferred embodiment (#1, above) except that the map consists of a single manufacture 50 in the shape of the compact flat pattern for a regular icosahedron as illustrated in FIG. 13, comprising twenty (20) individual map segments which together constitute a complete and useful map of Earth's surface, each map segment 52a, 52b, etc. being an equilateral triangle, the twenty (20) segments all being equal in size, and having a thin flexible rubber-like magnetic substratum. The twenty (20) individual map segments are appropriately hinged together at the adjacent edges so as to bend easily at those hinges 54 and the device is thus able to be formed into an icosahedron. The map can be placed properly upon the steel icosahedronal globe support form 12 and will be maintained in that configuration by the magnetic substratum's attraction to the steel form. The map can also be removed from the globe support form 12 and displayed as a one-piece map on a table or on a steel map support 18.

5. Description of Additional Embodiment

Figure 14:
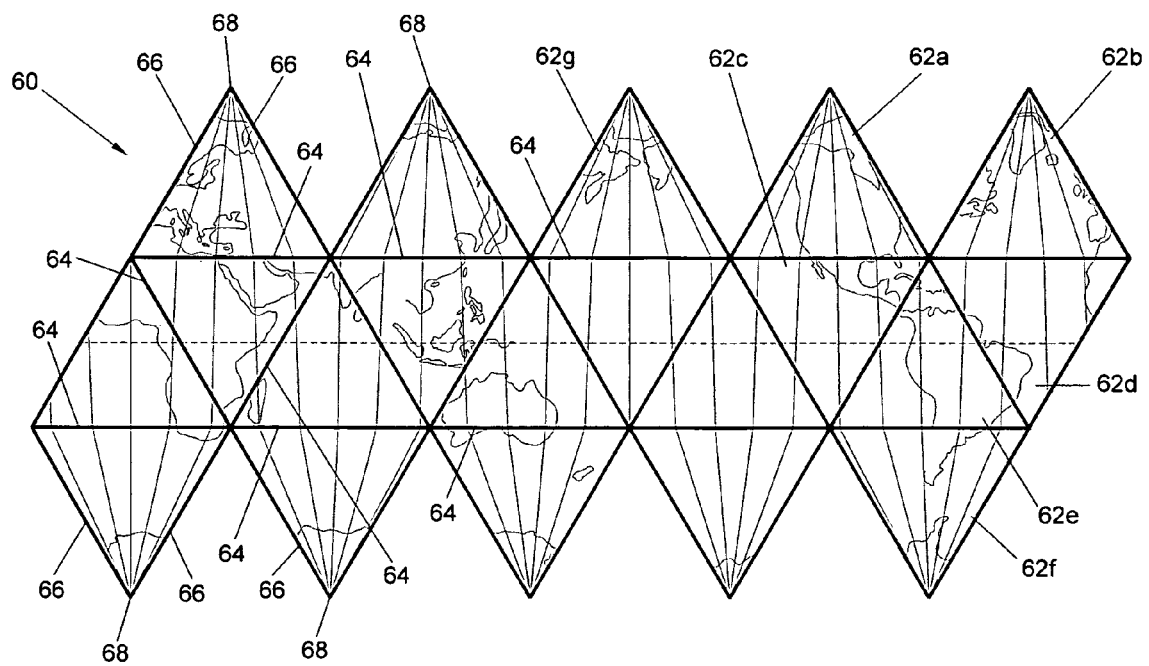
FIG. 14 is a front view of the map of this invention in the form of a compact flat pattern of a regular icosahedron with hinges between all adjacent pairs of triangular map segments and with fasteners along all external edges and/or at all external vertices.

FIGS. 1 and 14

This additional embodiment does not require a rigid globe support form. The device as illustrated in FIG. 14 consists of a single manufacture 60 in the shape of a compact flat pattern for a regular icosahedron as described in #4 above. The map illustration is printed directly upon a substantially rigid substratum, or on a suitable stratum which is subsequently affixed to a substantially rigid substratum. The twenty (20) individual map segments 62a, 62b, etc. are appropriately hinged together at adjacent edges so as to bend easily at those hinges 64 and the device is thus able to be formed into an icosahedron. Appropriate fasteners 66 and 68 (as described in #2 and #3 above) along the free edges and/or at the free vertices will maintain the device in the icosahedron shape, and can be released to allow the device to be returned to the flat condition.

6. Description of Additional Embodiment

Figure 15:
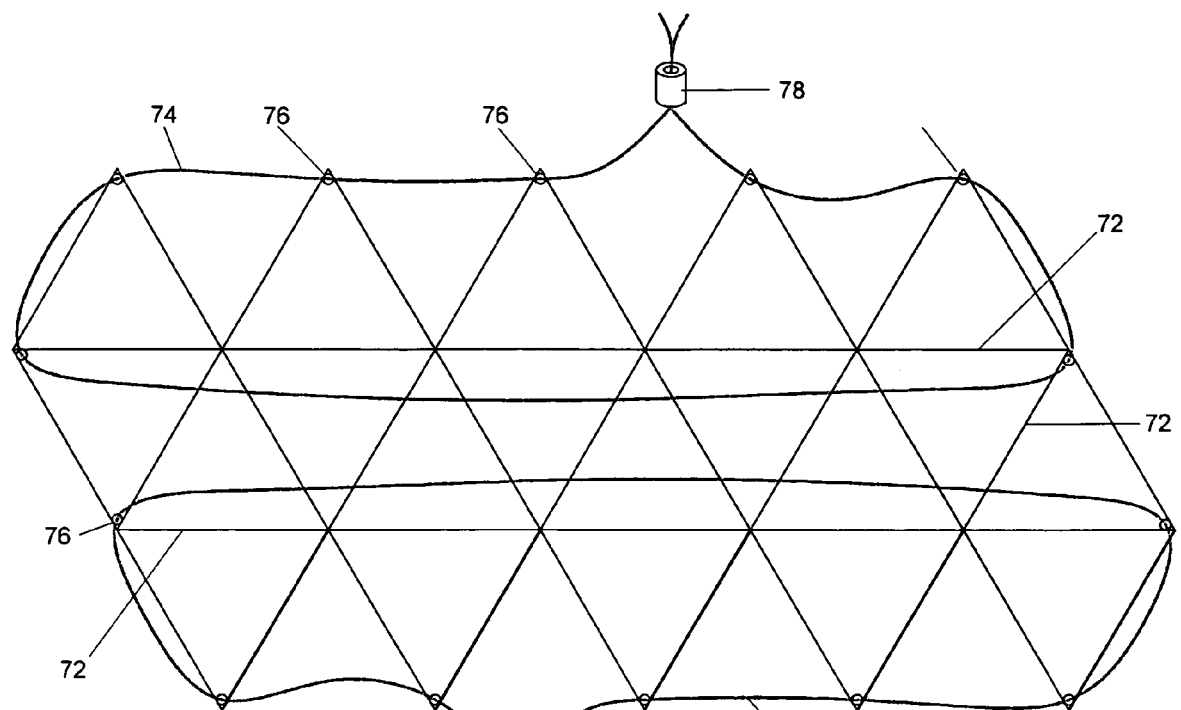
FIG. 15 is a reverse-side view of the map of this invention as a compact flat pattern of a regular icosahedron with hinges between all adjacent pairs of triangular map segments, and with vertex eyelets and strings which can be used to pull the map into an icosahedronal globe configuration.
Figure 16:
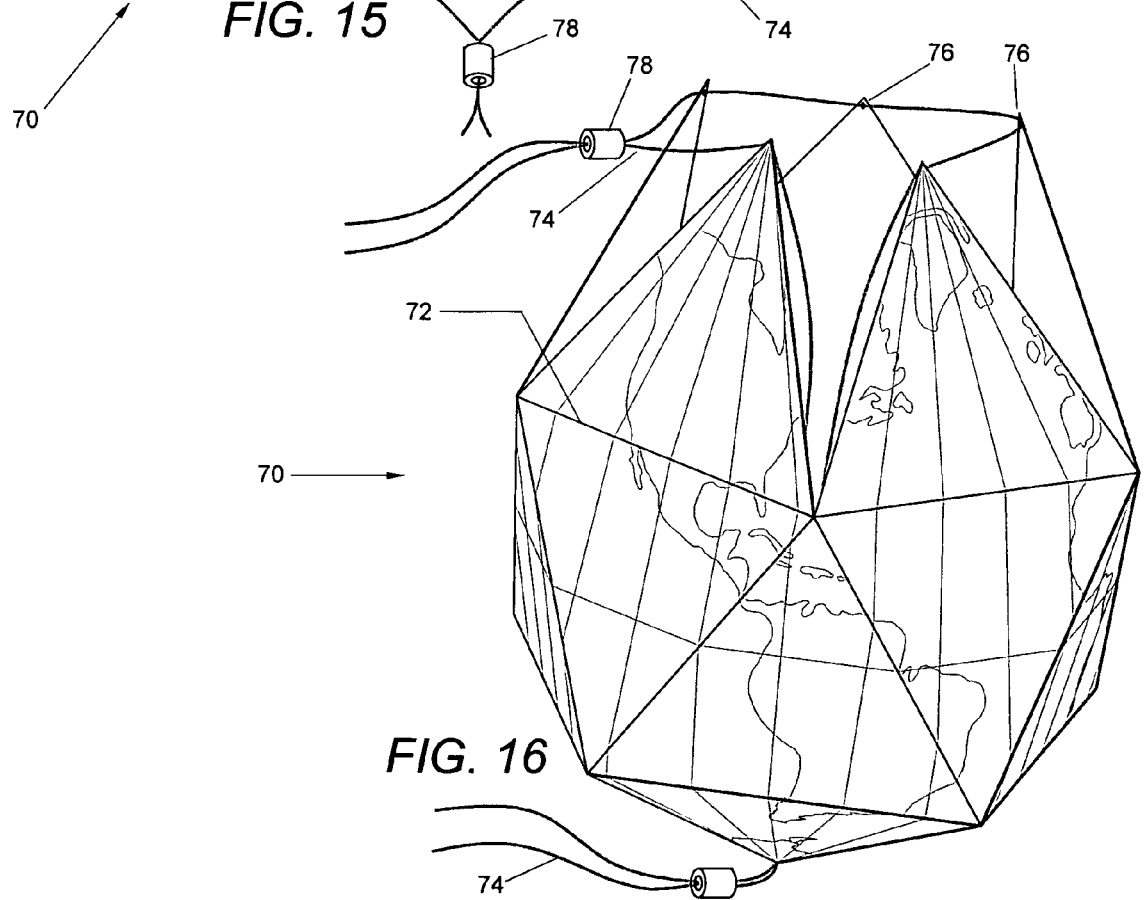
FIG. 16 is a partially exploded perspective view of the map of FIG. 15, prior to final closing into an icosahedronal globe configuration by string tension.

FIGS. 15 and 16

An additional embodiment consists of a single manufacture 70 similar to 50 and 60 as described above, with or without the edge and/or vertex fasteners. Eyelets 76 are placed at the fourteen (14) exterior vertices and one or more strings 74 are threaded through the eyelets, as shown in FIG. 15. Pulling the string(s) 74 will draw the flat pattern into the desired icosahedronal shape for the globe configuration 70 as shown in FIG. 16. Sliding keepers 78 on the string(s), or simple knots, will maintain string tension and maintain the icosahedronal shape until it is desired to release the string tension and return the device to the map configuration. Edge and/or vertex fasteners, if used, will also maintain the globe shape.

Description of Additional Embodiments

FIGS. 17, 18, 19, and 20

Figure 18:
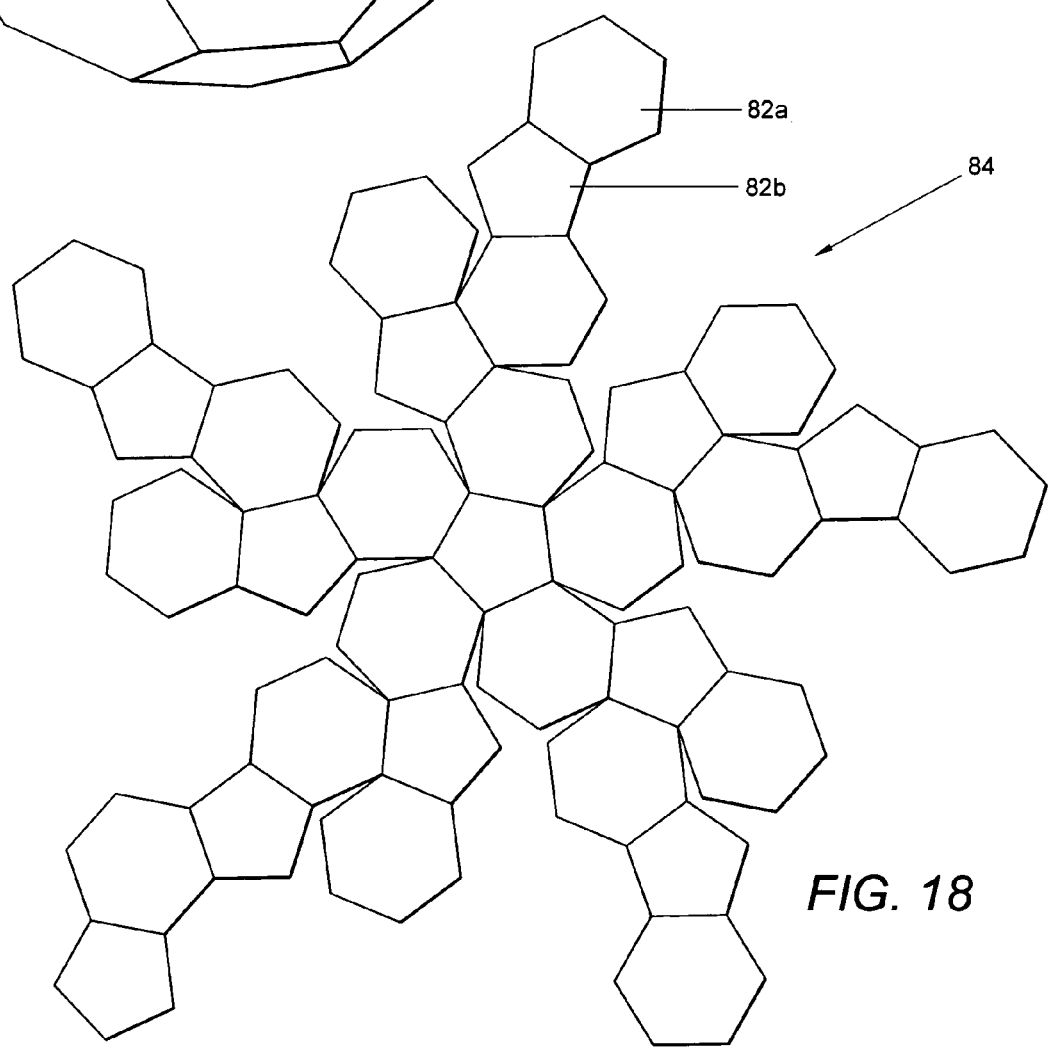
FIG. 18 is a front view of a flat pattern of an equilateral truncated icosahedron.

Additional embodiments of the types specifically described above are possible using polyhedra other than the regular icosahedron. Using materials, fasteners or adhesives, and fabrication techniques similar to those already described for other embodiments, the invention may be designed and manufactured using, for example, the equilateral truncated icosahedron as a basis. The equilateral truncated icosahedron 80 is illustrated in FIG. 17, and is generally familiar as the geometric basis of the typical soccer ball. This polyhedron has thirty-two (32) flat faces, twenty (20) of which are regular hexagons 82a and twelve (12) of which are regular pentagons 82b. All of the edges are straight and of the same length. One particular advantage of using the truncated icosahedron 80 as a basis for this invention is that the more numerous and therefore relatively smaller individual map segments provide for greater accuracy in the mapping for any chosen mapping process, as compared to the 20-piece icosahedronal basis 12 of the preferred embodiment. One disadvantage is the difficulty of arranging the thirty-two (32) individual map segments compactly, as shown by a comparison between the compact flat pattern 22 of the icosahedron in FIG. 9 and a typically divergent flat pattern 82 of the truncated icosahedron as shown in FIG. 18. The different hexagonal 82a and pentagonal 82b map segments can always be arranged properly adjacent for specific route tracing and measurement, but the compact and relatively gap-free nature of the arrangements of triangular map segments 20a, 20b, etc. of the icosahedronal basis as shown in FIGS. 4 and 5 is not attainable with the truncated icosahedron.

Figure 19:
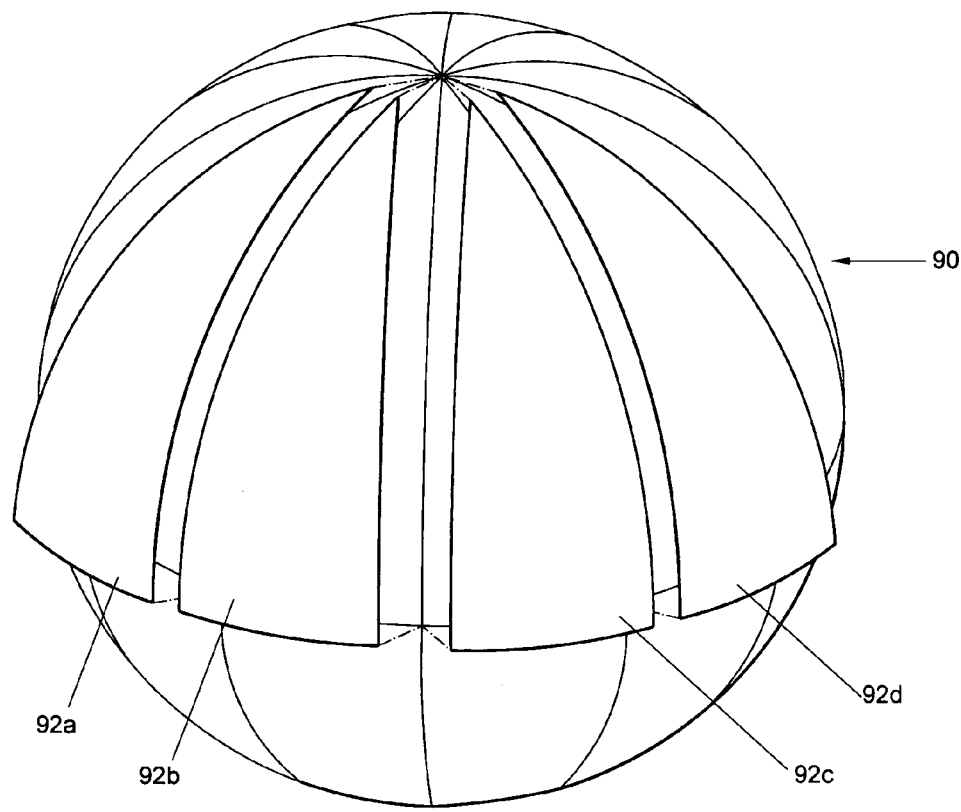
FIG. 19 is a partially exploded perspective view of an approximately spherical globe support form showing in addition several individual unmarked surface segments of the globe near their respective positions on the globe.

Other embodiments may use similar materials and techniques with significantly different geometric bases. For instance, traditional globes are frequently manufactured using approximately twenty-four (24) individual spherical triangular map segments ("orange slices") glued to a rigid spherical support as illustrated in FIG. 19. This present invention can be made using a similar number of individual segments 92a, 92b, etc. with the appropriate map markings printed upon them, and those individual segments conformably fitted and attached to a spherical rigid globe support form 90. That will produce a satisfactorily realistic globe which is more nearly spherical than the regular icosahedron. Those curved map segments, though, will not provide as realistic a map as the triangular segments 20a, 20b, etc. provide. The curved edges of the spherical map segments 92a, 92b, etc. cannot be arranged properly adjacent as a map without gaps.

Figure 20:
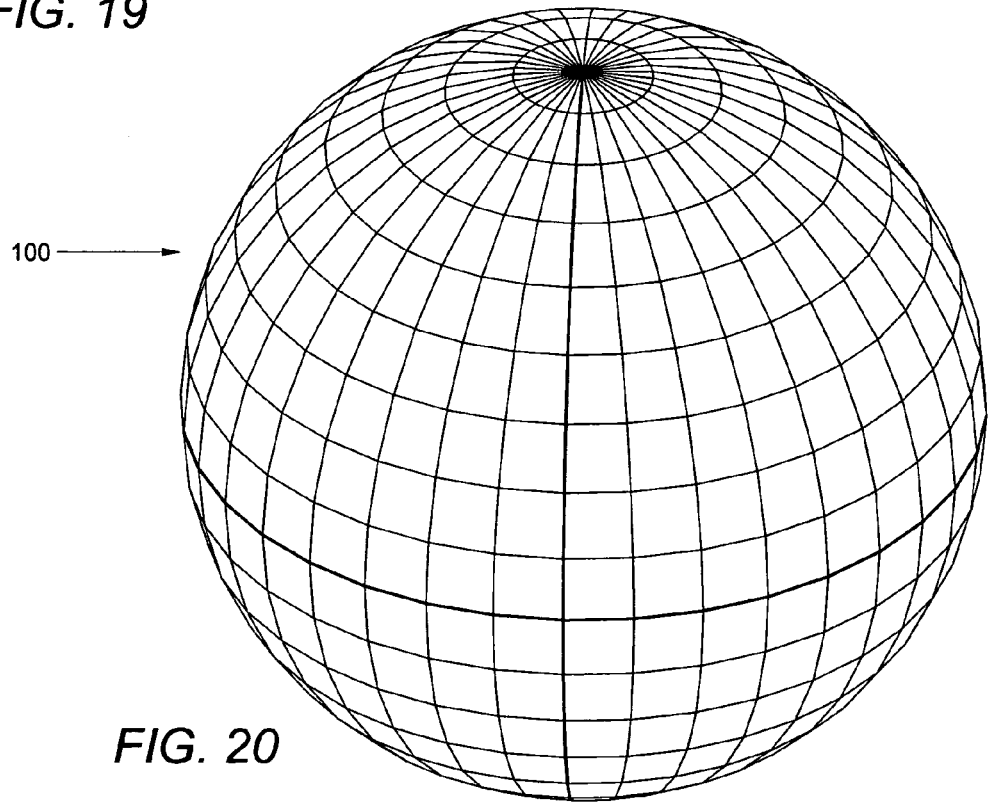
FIG. 20 is a perspective view of a complex geometrical subdivision for the globe of this invention, consisting primarily of small spherical rectangle surface segments representing ten (10) degrees square portions of the sphere.

Similar advantages and disadvantages will obtain for other geometric divisions of the sphere. Such divisions include, for example, approximately rectangular segments of the spherical surface 100, perhaps ten (10) degrees on each edge as illustrated in FIG. 20. There are infinite possible geometric divisions of the spherical surface, but practical considerations require a balance between useful accuracy of the mapping, complexity of the device, cost of manufacturing, and ease of use. These and other considerations led to the present choice of the preferred embodiment as described in #1 above, which does seem to be the simplest and initially most useful form of the invention.

8. Description of Additional Embodiment

Figure 21:
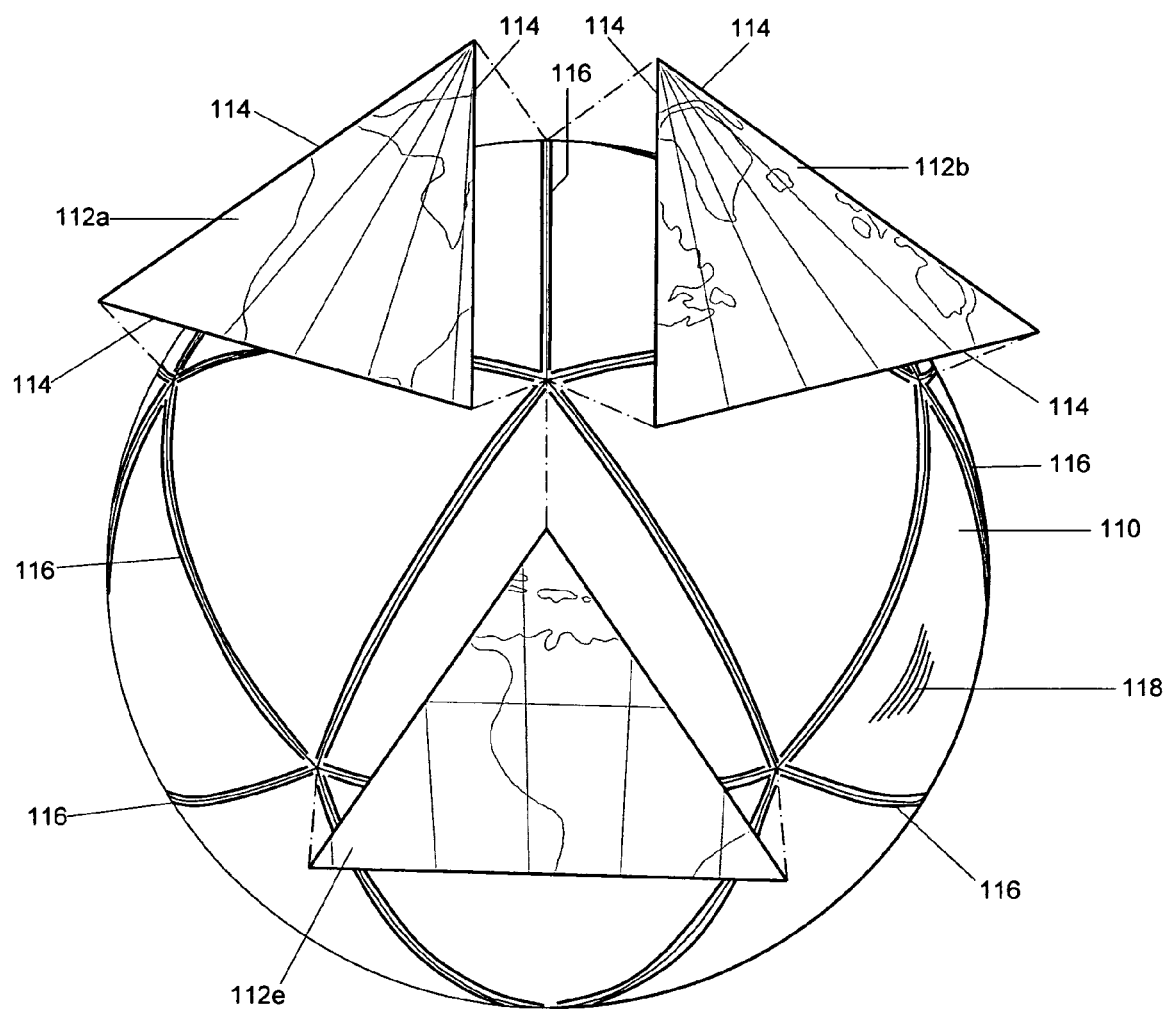
FIG. 21 is a perspective view of a spherical icosahedronal globe support form showing several flexible and elastic triangular map segments prior to being positioned, conformed, and attached to the globe support form.

FIGS. 4 and 21

This additional embodiment of the invention has the advantage of providing perhaps the most realistic possible globe and map within the spirit of this invention. It represents what may be the ultimate and optimal embodiment of the invention, but it also involves significant complexity in materials, in manufacture, and in use.

This embodiment consists of these related manufactures:
1. A rigid, hollow spherical globe support form 110 as illustrated by FIG. 21 having an appropriate exterior surface or surface fasteners as described below;
2. A rectangular map support 18 of sufficient size and having an appropriate exterior surface or surface fasteners to accommodate the map segments described below, suitably framed for rigidity and user safety and equipped for wall hanging;
3. A set of twenty (20) individual map segments 112a, 112b, etc. which together constitute a complete and useful map of Earth's surface, each map segment being an equilateral triangle of appropriate size, and having edge fasteners as described below, and having a thin, flexible, and elastic substratum;
4. An optional base to hold the globe support form.

The individual map segments 112a, 112b, etc. in this embodiment are simultaneously flexible and elastic. All of the map segments have linear strips 114 of flexible but inelastic hook-and-loop material or other relatively strong, simple fasteners along all of their edges. Unstretched and laid flat, the triangular map segments are equivalent in appearance to those described in the preferred embodiment (#1) and several other embodiments above.

The spherical rigid globe support form must have either an exterior surface 118 which is everywhere compatible with the hook-and-loop edge fasteners of the map segments, or strips 116 of compatible fastener material appropriately positioned on its outer surface. In use, when the flexible and elastic map segments are properly positioned, conformed, and attached to the spherical globe support form, their edges will not be stretched. Only the interior area of each map segment will be stretched as necessary to conform to the spherical globe support form.

When the map segments are removed from the globe support form, the elastic material will relax and lay flat with straight edges. The map segments can be laid on a table or other horizontal surface as described for other embodiments, or affixed to a special map support 18 which has a working surface 14, or fasteners upon that surface 14, compatible with the edge fasteners of the map segments.

If the map illustration is printed upon the map segments 112a, 112b, etc. in such a way that the illustration is accurate when the map segments are stretched and affixed to the spherical globe support form, it is apparent that considerable accuracy of representation is possible. The resulting globe can be made to be as accurate as any ordinary globe, and the resulting map as formed by the unstretched segments may well represent the ultimate in overall mapping accuracy, consistent with the chosen scale and the geometric subdivision of the device. I perceive that this is comparable to the result of Fuller's technique, without necessarily requiring the complex and intense mathematical and graphical work of Fuller's method.

Various additional alternate embodiments and configurations of the invention herein disclosed will suggest themselves to skilled and thoughtful persons who consider this invention. The present disclosure of a preferred embodiment and selected additional embodiments is for purposes of explanation and example only and is not to be construed as a limitation of the invention. Any and all geometric shapes, materials, manufacturing techniques, additions, modifications and refinements which are within the spirit of the invention are intended to be included within the scope of the appended claims.

Having thus set forth the nature of the invention, I claim:

1. A cartographic device comprising
   A. a substantially rigid globe support form having a convex and approximately spherical and substantially monolithic exterior surface,
   B. a plurality of flexible and elastic flat map panels of predetermined thickness each having an obverse and a reverse surface,
   C. a map portrayed on the obverse surfaces of said flat map panels, and
   D. means for conformably and removably attaching the reverse surface of each flexible and elastic flat map panel to the convex exterior surface of said globe support form,
   whereby in combination said map portrayed on said map panels conformably attached to said globe support form constitutes a globe, and
   whereby said map panels can be conveniently removed from said globe support form.

2. A cartographic device as defined in claim 1 further comprising
   E. a substantially flat and substantially rigid and substantially monolithic flat map support panel having an obverse and a reverse surface, and
   F. means for conformably and removably attaching the reverse surface of each flat map panel to the obverse surface of said flat map support panel,
   whereby in combination said map portrayed on said map panels conformably attached to said globe support form constitutes a globe, and
   whereby said map panels can be conveniently removed from said globe support form, and
   whereby in combination said map portrayed on said map panels attached to said flat map support panel constitutes a flat map, and
   whereby said map panels can be conveniently removed from said flat map support panel.

3. A new article of manufacture comprising
   A. a substantially rigid inner form having a convex and approximately spherical and substantially monolithic exterior surface,
   B. a plurality of flexible and elastic flat outer panels of predetermined thickness each having an obverse and a reverse surface,
   C. a plurality of symbolic markings of predetermined significance on said obverse surfaces of said flat outer panels, and
   D. means for conformably and removably attaching the reverse surface of each flexible and elastic flat outer panel to the convex exterior surface of said inner form,
   whereby in combination said symbolic markings on said outer panels attached to said inner form constitute a marked three-dimensional article of predetermined interest, and whereby said outer panels can be conveniently removed from said inner form.

4. A new article of manufacture as defined in claim 3 further comprising E. a substantially flat and substantially rigid and substantially monolithic flat support panel having an obverse and a reverse surface, and F. means for conformably and removably attaching the reverse surface of each flat outer panel to the obverse surface of said flat support panel, whereby in combination said symbolic markings on said outer panels attached to said inner form constitute a marked three-dimensional article of predetermined interest, and whereby said outer panels can be conveniently removed from said inner form, and whereby in combination said symbolic markings on said outer panels attached to said flat support panel constitute a two-dimensional article of predetermined interest, and whereby said outer panels can be conveniently removed from said flat support panel.

* * * * *